United States Patent
Leong et al.

(10) Patent No.: US 7,848,326 B1
(45) Date of Patent: Dec. 7, 2010

(54) PACKET SWITCH APPLIANCE WITH A PACKET SWITCHING AND PACKET PROCESSING DAUGHTER BOARD

(75) Inventors: Patrick Pak Tak Leong, Palo Alto, CA (US); Thomas K. Y. Cheung, Fremont, CA (US); King L. Won, San Jose, CA (US); Ted C. Ho, San Jose, CA (US)

(73) Assignee: Gigamon LLC., Milpitas, CA (US)

( * ) Notice: Subject to any disclaimer, the term of this patent is extended or adjusted under 35 U.S.C. 154(b) by 752 days.

(21) Appl. No.: 11/796,001

(22) Filed: Apr. 25, 2007

(51) Int. Cl.
*H04L 12/56* (2006.01)

(52) U.S. Cl. .................. 370/392; 370/400; 710/301; 361/785

(58) Field of Classification Search .............. None
See application file for complete search history.

(56) References Cited

U.S. PATENT DOCUMENTS

| | | | |
|---|---|---|---|
| 7,424,018 B2 * | 9/2008 | Gallatin et al. | 370/389 |
| 7,436,832 B2 * | 10/2008 | Gallatin et al. | 370/389 |
| 7,440,467 B2 * | 10/2008 | Gallatin et al. | 370/401 |
| 7,460,534 B1 * | 12/2008 | Bellenger, Donald M. | 370/392 |
| 7,543,208 B2 * | 6/2009 | Jun et al. | 714/727 |
| 7,616,646 B1 * | 11/2009 | Ma et al. | 370/401 |
| 2005/0190695 A1 * | 9/2005 | Phaal | 370/229 |
| 2005/0202847 A1 * | 9/2005 | Yu et al. | 455/560 |
| 2005/0254490 A1 | 11/2005 | Gallatin et al. | |
| 2005/0265248 A1 | 12/2005 | Gallatin et al. | |
| 2005/0265364 A1 | 12/2005 | Gallatin et al. | |
| 2005/0271065 A1 | 12/2005 | Gallatin et al. | |
| 2009/0135835 A1 * | 5/2009 | Gallatin et al. | 370/400 |
| 2009/0262745 A1 * | 10/2009 | Leong et al. | 370/396 |

* cited by examiner

*Primary Examiner*—Min Jung
(74) *Attorney, Agent, or Firm*—Vista IP Law Group, LLP.

(57) ABSTRACT

A packet switch appliance for connection to a packet switching network, the packet switch appliance has a motherboard that includes a processor, a network switch chip, and a connector. The packet switch appliance also includes a daughter board configured to be removably connected to the motherboard through the connector. The daughter board may include one or more of a network switch chip and a processor unit.

45 Claims, 7 Drawing Sheets

PACKET SWITCH APPLIANCE WITH A PACKET SWITCHING AND PACKET PROCESSING DAUGHTER BOARD

BACKGROUND

1. Field

The present application relates generally to network switches and, more specifically, to a packet switching appliance with a packet switching daughter board.

2. Related Art

In a packet-switching network, the transmission, routing, forwarding, and the like of messages between the terminals in the packet-switching network are broken into one or more packets. Typically, data packets transmitted or routed through the packet switching network comprise three elements: a header, a payload, and a trailer. The header may comprise several identifiers such as source and destination terminal addresses, VLAN tag, packet size, packet protocol, and the like. The payload is the core data for delivery, other than header or trailer, which is being transmitted. The trailer typically identifies the end of the packet and may comprise error checking information. Data packets may conform to a number of packet formats such as IEEE 802.1D or 802.1Q.

Associated with each terminal in the packet-switching network is a unique terminal address. Each of the packets of a message has a source terminal address, a destination terminal address, and a payload, which contains at least a portion of the message. The source terminal address is the terminal address of the source terminal of the packet. The destination terminal address is the terminal address of the destination terminal of the packet. Further, each of the packets of a message may take different paths to the destination terminal, depending on the availability of communication channels, and may arrive at different times. The complete message is reassembled from the packets of the message at the destination terminal. One skilled in the art commonly refers to the source terminal address and the destination terminal address as the source address and the destination address, respectively.

Packet switch appliances can be used to forward packets in the packet-switching network, based on their address information, to their destination terminals. Typically, packet switch appliances have one or more network ports for connection to the packet-switching network. The network port of a packet switch appliance can include a filter, which either drops or forwards packets. Packet switch appliances may also have one or more instrument ports connected to one or more network instruments, typically used to monitor packet traffic, such as packet sniffers, intrusion detection systems, intrusion prevention systems, or forensic recorders.

The packet switching demands of networks may vary greatly depending on the size and complexity of the network and the amount of packet traffic. Users may also desire expanded packet handling and processing functionality beyond basic switching, routing, and filtering. Users may also wish to deploy various network instruments for monitoring packet traffic.

SUMMARY

In one exemplary embodiment, a packet switching appliance is connected to a packet-switching network and one or more network instruments. The packet switching appliance has a motherboard that includes a processor, a first network switch chip, and a connector. The packet switching appliance also includes a daughter board which is removably connected to the motherboard through the connector. The daughter board includes a second network switch chip having a plurality of ports.

DESCRIPTION OF DRAWING FIGURES

Features and advantages of the present application will become apparent from the following detailed description, when it is considered in conjunction with the accompanying drawings figures.

DETAILED DESCRIPTION

The following description sets forth numerous exemplary configurations, parameters, and the like. It should be recognized, however, that such description is not intended as a limitation on the scope of the present invention, but is instead provided as a description of exemplary embodiments.

A. Network Configuration

Figure 1:
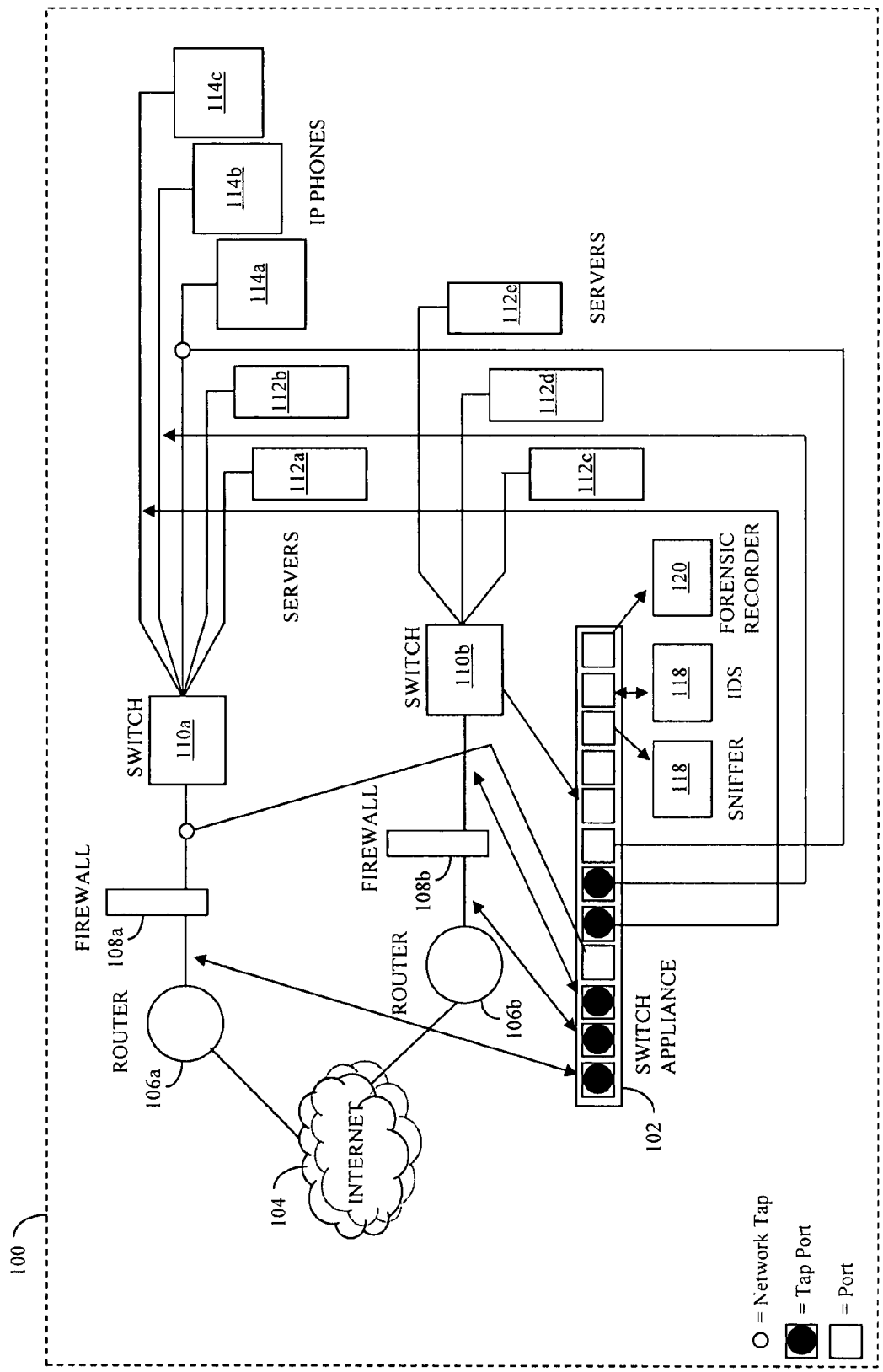
FIG. 1 illustrates an exemplary packet switching network and a packet switch appliance.

With reference to FIG. 1, in one exemplary embodiment, a packet switch appliance 102 is integrated into a packet switching network 100. The internet 104 is connected via routers 106a and 106b and firewalls 108a and 108b to switches 110a and 110b. Switch 110a is also connected to servers 112a and 112b and to IP phones 114a-c. Switch 110b is also connected to servers 112c-e. Packet switch appliance 102 is connected to various points of the network via network taps and tap ports on the packet switch appliance. Packet switch appliance 102 is also connected to a variety of network instruments for monitoring network-wide packet traffic: packet sniffer 116, intrusion detection system 118, and forensic recorder 120. In alternate embodiments, a packet switching network may comprise fewer components or more components, than those depicted, and the connection of the packet switch appliance to the network may be varied.

In the embodiment of FIG. 1, because packet switch appliance 102 is connected to every device in the packet-switching network, the packet switch appliance has a global network footprint and may potential access all data packets transmitted across the network. Consequently, network instruments, e.g., packet sniffer 116, intrusion detection system 118, and forensic recorder 120, which are connected to packet switch appliance 102, can potentially access information anywhere throughout the packet-switching network.

A user of network 100, such as a network administrator, may wish to configure packet switch appliance 102 to perform a range of packet handling, distribution, or processing functionalities.

Packet switch appliance 102 may be configured to perform a number of packet distribution and handling functions such as one-to-one, one-to-many, many-to-one, and many-to-many port distributing, filtering, flow-based streaming, and load balancing. For a more detailed description of these features, see U.S. patent application Ser. Nos. 11/123,273; 11/123,377; 11/123,465; and 11/123,729, all of which were filed on May 5, 2005, and which are all incorporated herein by reference, in their entireties. Packet switch appliance 102 may also perform packet modifications functions such as packet slicing and packet regeneration based on header, payload, trailer, or other packet information.

Packet switch appliance 102 may also be configured to perform packet processing functions such as packet modification. Packet modification may include, but is not limited to, additions or deletions to components of a packet, such as packet slicing or packet time stamping. Packet copying, packet regeneration, and packet flow control are additional examples of packet processing.

Due to its global footprint, the packet switch appliance 102 of FIG. 1 may potentially distribute, handle, or process data packets with a greater efficiency than may be realized by an appliance, instrument, or tool with less than a global footprint. Consequently, greater network or hardware efficiency, reduced bandwidth consumption, and/or increased performance may potentially be realized. Packet switch appliance 102 may find use as a network visibility system in conjunction with network instruments for packet traffic monitoring such as packet sniffers, intrusion detection systems, intrusion prevention systems, forensic recorders, and the like. Further, packet switch appliance 102 may be used as an in-data path content processing engine to further increase network and bandwidth efficiency over existing packet switch appliances by modifying, copying, and/or flow controlling packets in addition to packet switching.

However, a given user may only require a subset of the potential functionalities of the packet switch appliance. Accordingly, it is beneficial and efficient for the packet switch appliance to be configured with scaleable capacity and functionality ranging from basic packet handling and distribution to packet processing.

B. Packet Switch Appliance Mother Board

Figure 2:
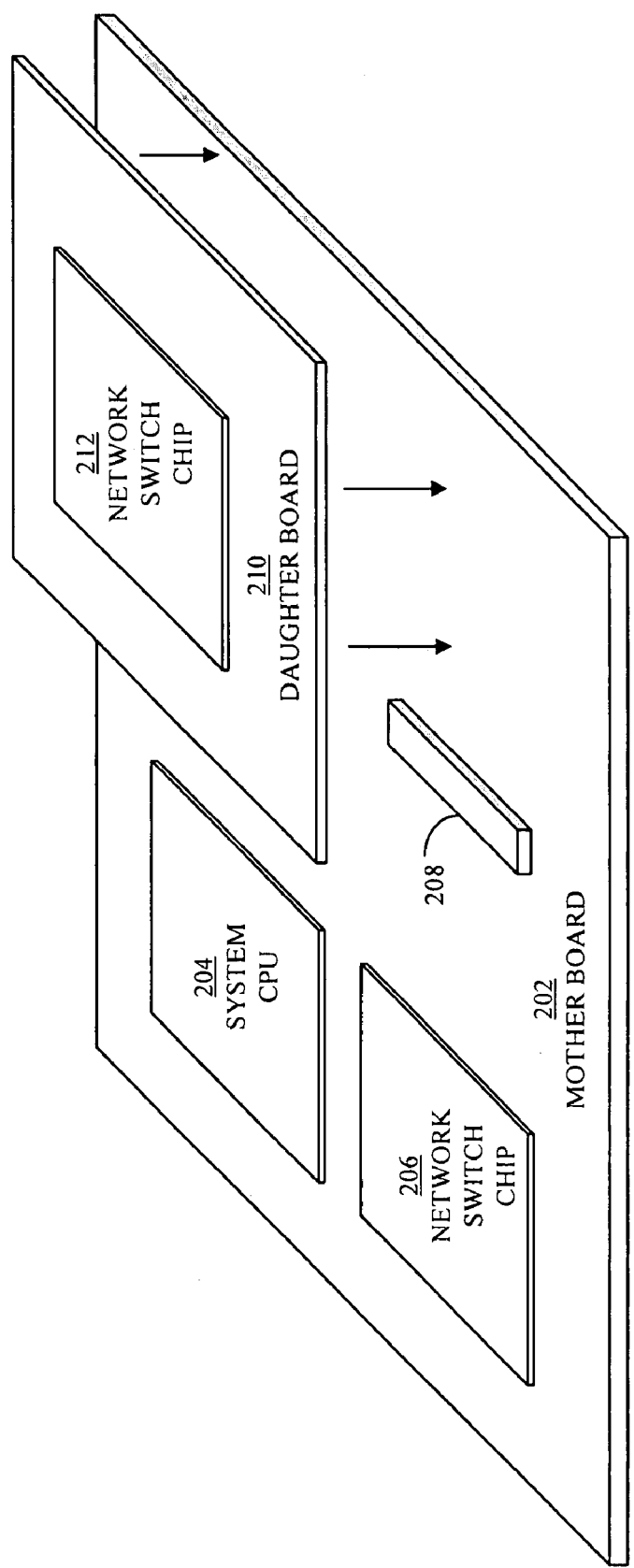
FIG. 2 illustrates an exemplary mother board and daughter board having a network switch of a packet switch appliance.
Figure 4:
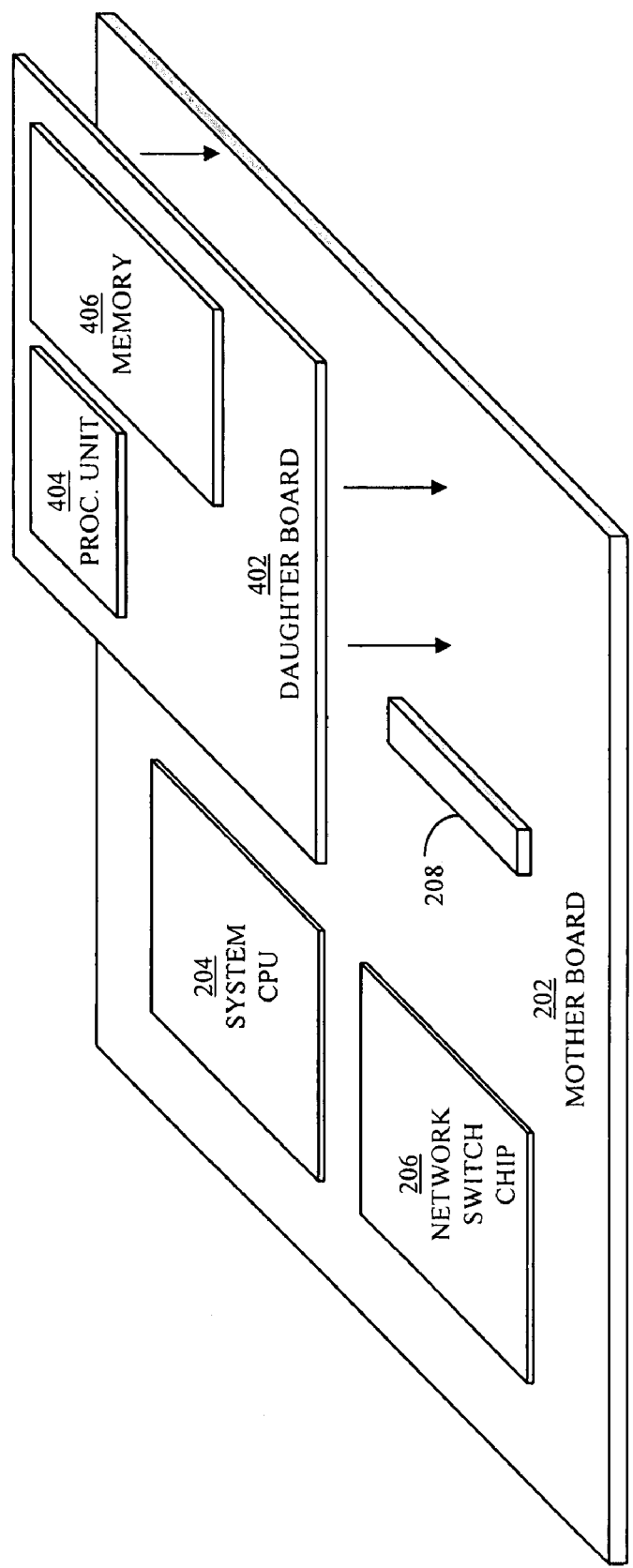
FIG. 4 illustrates an exemplary mother board and daughter board having a processor unit of a packet switch appliance.
Figure 6:
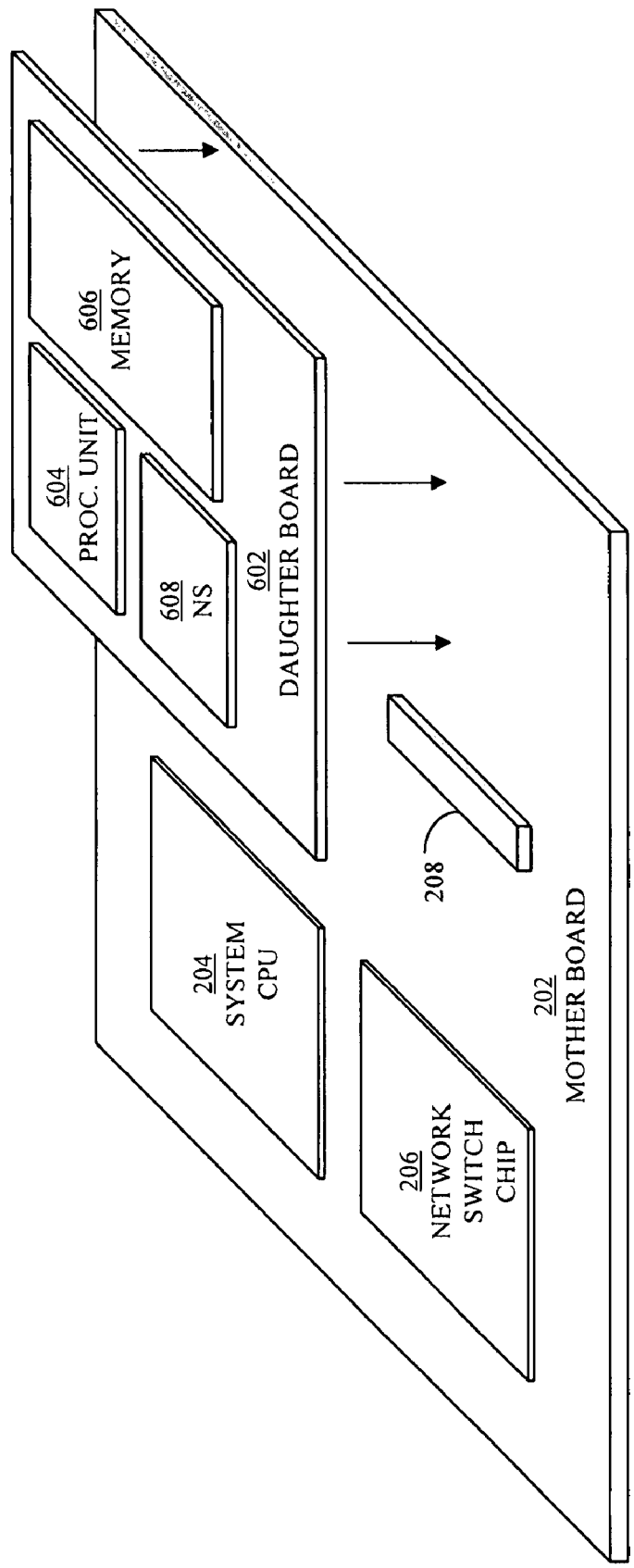
FIG. 6 illustrates an exemplary mother board and daughter board having a processor unit and a network switch of a packet switch appliance.

In embodiments depicted in FIGS. 2, 4, and 6, packet switch appliance 102 may include a mother board, which is the central or primary circuit board for the appliance. A number of system components may be found on mother board 202. System CPU (central processing unit) 204 interprets programming instructions and processes data, among other functions. Network switch chip 206, also referred to as an "ethernet switch chip" or a "switch-on-a-chip", provides packet switching and filtering capability in an integrated circuit chip or microchip design. Connector 208 provides mother board 202 with the capacity to removably accept peripheral devices or additional boards or cards. In one embodiment, connector 208 allows a device, such as a daughter or expansion board, to directly connect to the circuitry of mother board 202. Mother board 202 may also comprise numerous other components such as, but not limited to, volatile and non-volatile computer readable storage media, display processors, and additional peripheral connectors. The packet switch appliance may also be configured with one or more hardware ports or connectors for connecting servers, terminals, IP phones, network instruments, or other devices to the packet switch appliance.

Network switch chip 206 is provided with a plurality of ports and may also be provided with one or more filters. The ports may each be half-duplex or full-duplex. Each of the ports may be configured, either separately or in combination, as a network port, an instrument port, a transport port, or a loop-back port. Network ports are configured for connection to and/or from the network. Instrument ports are configured for connection to and/or from a network instrument, such as a packet sniffer, intrusion detection system, or the like. Transport ports are configured for connection to and/or from another network switch chip, another switch appliance, or a processor unit, as described below. Loop-back ports are configured to loop packets out of, and back into, the network switch chip.

Each loop-back port can be implemented using a single port. For example, an egress portion and an ingress portion can be separate paths in a single port. Alternatively, a loop-back port can be implemented using a pair of ports connected together. For example, an egress portion can correspond to a first port, and an ingress portion can correspond to a second port, which is separate from the first port but connected to the first port. The network switch appliance may include instructions stored on a computer readable medium for configuring single or dual port loop-back ports. The instructions may be executed on CPU 204. Each loop-back port reduces the number of ports available to be configured as a network, instrument, or transport port by at least one.

Each of the ports of network switch chip 206 may be associated with one or more packet filters that drop or forward a packet based on a criterion. For example, a loop-back port may be configured with an HTTP filter associated with its ingress portion which drops all HTTP packets.

C. Daughter Board Having a Network Switch

In an embodiment depicted in FIG. 2, daughter board 210 is configured to be removably connected to a mother board 202, via connector 208. Daughter board 210 is a secondary circuit board of variable configuration. The daughter board may be connected parallel to or in the same plane as the mother board, as shown. In the parallel configuration, the daughter board may also be referred to as a mezzanine board. Alternatively, the daughter board may be oriented perpendicularly to the plane of the mother board, or it may be connected in a differing orientation. Use of a daughter board may provide a number of advantages including, but not limited to, variable configuration of a basic design, ease and reduced cost of upgradeability, variability of the circuit board form factor, and scalability of packet switch appliance functionality.

Daughter board 210 of FIG. 2 includes a network switch chip 212, which may or may not be a network switch chip having the same design specification as network switch chip 206 residing on mother board 202. As with motherboard 202, daughter board 210 of FIG. 2 may also comprise numerous other components.

Typically, network switch chip 212 is an integrated circuit chip configured with a plurality of ports and one or more filters, as described above. Network switch chip 212 may provide the packet switch appliance with supplemental or expanded packet switching capabilities, including additional packet filtering capabilities. For example, one or more ports of network switch chip 212 may be configured as a loop-back port with an associated filter.

A first filter of network switch chip 212 may be associated with a first port of network switch chip 212. A second filter may be associated with the first port or a second port, and so forth. In the one embodiment, each of the filters is configured to only filter packets entering through the port associated with the filter. In alternative embodiments, the filters may also be configured as egress filters for filtering packets exiting through the port associated with the filter.

D. Packet Flow in Appliance with a Daughter Board Having a Network Switch

Figure 3:
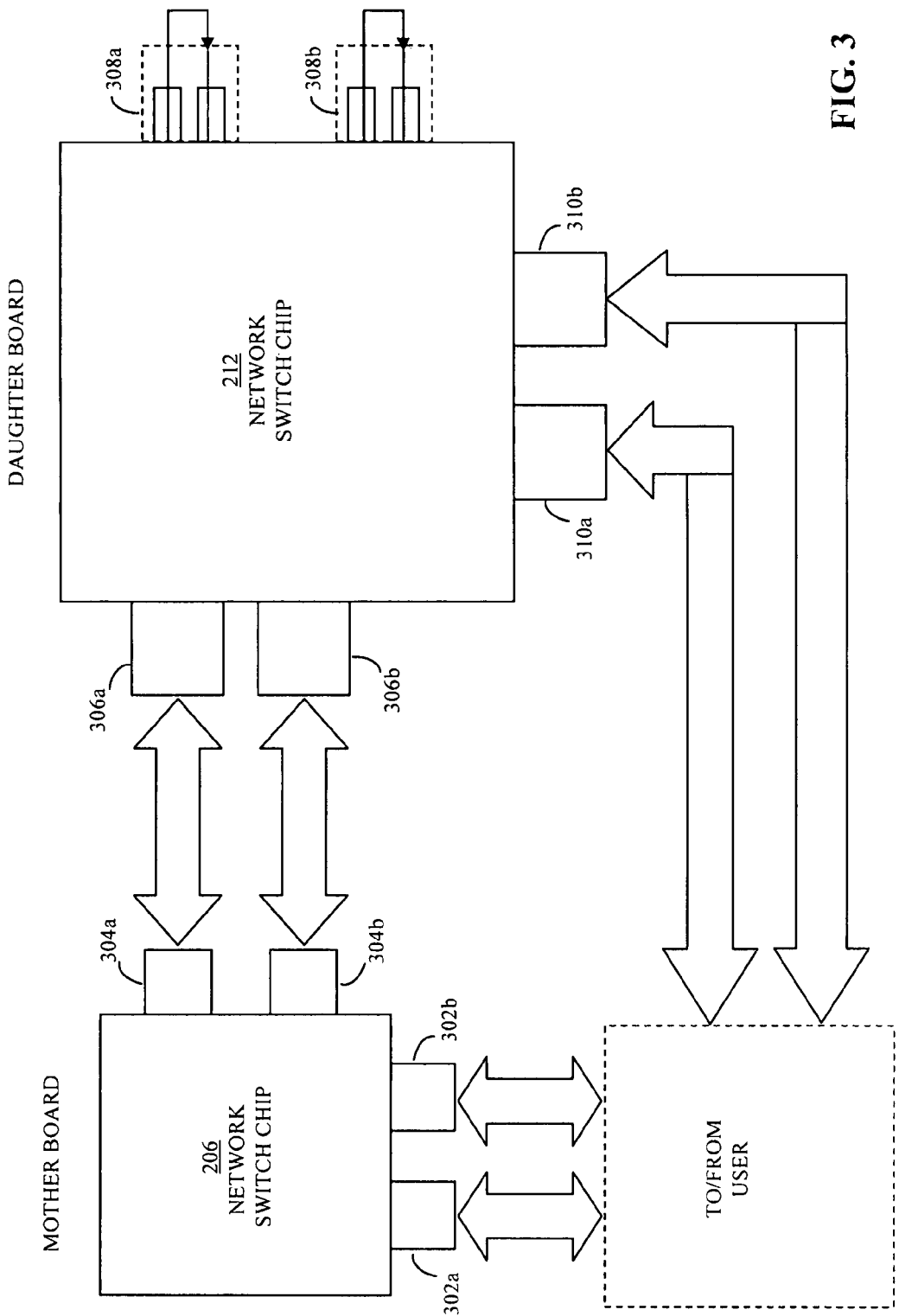
FIG. 3 illustrates an exemplary packet handling process in an exemplary packet switch appliance with a daughter board having a network switch.

FIG. 3 logically depicts an example of packet flow in a network switch appliance 102 having a mother board removably connected to a daughter board having a network switch.

In a first example, a packet is routed from an ingress port to an egress port, both on network switch chip 206. Assume that port 302a is a network port, that port 302b is an instrument port, and that the packet switch appliance is configured to route all packets from network port 302a to instrument port 302b. An ingress packet received at network port 302a is routed to instrument port 302b for egress by network switch chip 206.

In a second example, a packet is routed from an ingress port on network switch chip 206 to an egress port on network switch chip 212. Assume that port 302a is a network port, that port 310b is an instrument port, and that ports 304a, 304b, 306a, and 306b are transport ports. Further assume that the packet appliance is configured to route all packets from network port 302a to instrument port 310b. An ingress packet received at network port 302a is routed to transport port 304a for egress by network switch chip 206. The packet is received by network switch chip 212 at transport port 306a and routed to instrument port 310b for egress. In another embodiment, the packet is routed via transport ports 304b and 306b. Accordingly, packets received by the packet switch appliance may be routed either through one or more network switch chips based on the ingress and egress ports.

In a third example, packet traffic is routed from an ingress port to an egress port, both on network switch chip 206, with filtering via a loop-back port on network switch chip 212. Assume that port 302a is a network port, that port 302b is an instrument port, that ports 304a, 304b, 306a, and 306b are transport ports, and that port 308a is a loop-back port having an HTTP-only ingress filter. Further assume that the packet appliance is configured to route only HTTP packets from network port 302a to instrument port 302b. However, it is desirable to have network port 302a also forward all packets to ports other than instrument port 302b via one-to-many packet distribution and for instrument port 302b to receive all packets from ports other than network port 302a via many-to-one packet distribution. Accordingly, it is not possible to provide an HTTP-only ingress filter at network port 302a or an HTTP-only egress filter at instrument port 302b. Instead, loop-back port 308a is employed to perform the desired filtering. Ingress packet traffic comprising both HTTP and non-HTTP packets is received at network port 302a and routed to transport port 304a or 304b for egress by network switch chip 206. The packet traffic is received by network switch chip 212 at transport port 306a and routed to loop-back port 308a where non-HTTP packets are dropped by the HTTP-only ingress filter. The HTTP-only packet traffic is routed back to network switch chip 206 through transport port 306a and transport port 304a for egress at instrument port 302b.

It is understood that loop-back ports may be provided on either network switch chip 206 or network switch chip 212 and that more than one loop-back port may be employed to allow for cascade filtering. It is further understood that any combination of network ports, instrument ports, transport ports, and loop-back ports may be employed to provide a desired routing and/or filtering scheme using one or more network switch chips.

In an additional embodiment, network switch chip 206 and network switch chip 212 may be configured to operate on different Open Systems Interconnection Basic Reference Model (OSI) layers, up to the maximum OSI layer (Layer 7). For example, network switch chip 206 may be configured as a layer 2 switch while network switch 212 is configured to operate as a layer 3 or layer 4 switch or router.

E. Daughter Board with a Processor Unit

In another embodiment of the network switch appliance depicted in FIG. 4, daughter board 402 is configured to be removably connected to mother board 202. Daughter board 402 provides, in addition to packet distribution capabilities, packet processing capabilities. In a particular embodiment, daughter board 402 may be connected to mother board 202, after the removal of daughter board 210. Daughter board 402 is configured with a processor unit 404 and memory 406. As with motherboard 202, daughter board 402 of FIG. 4 may also comprise numerous other components.

Processor unit 404 may be any integrated circuit capable of routing and processing packets. Preferably, processor unit 404 may be, but is not limited to, an FPGA (field programmable gate array), NPU (network processor unit), multicore processor, multicore packet processor, or an ASIC (application specific integrated circuit) capable of routing packets, filtering packets, slicing packets, modifying packets, copying packets, or flow controlling packets. Processor unit 404 may function as a packet processor. Even more preferably, processor unit 404 is an integrated circuit having programmable logic blocks and programmable interconnects that is capable of packet processing. Processor unit 404 may include firmware having instructions for packet processing functions such as slicing, modifying, copying, or flow controlling packets. Processor unit 404 may process packets at line rate or at other than line rate.

Processor unit 404 may be configured with a plurality of connections, each of which may be configured, either separately or in combination, as a network connection, an instrument connection, or a transport connection. Network connections are configured for connection to and/or from the network. Instrument connections are configured for connection to and/or from a network instrument, such as a packet sniffer, intrusion detection system, or the like. Transport connections are configured for connection to and/or from a network switch chip network, another packet switch appliance, or another processor unit.

Memory 406 may be any computer readable storage medium or data storage device such as RAM or ROM. In one embodiment, processor unit 404 and memory 406 may be connected. In such an embodiment, processor unit 404 may contain firmware having computer programming instructions for buffering data packets on memory 406.

F. Packet Flow in Appliance with a Daughter Board Having a Processor Unit

Figure 5:
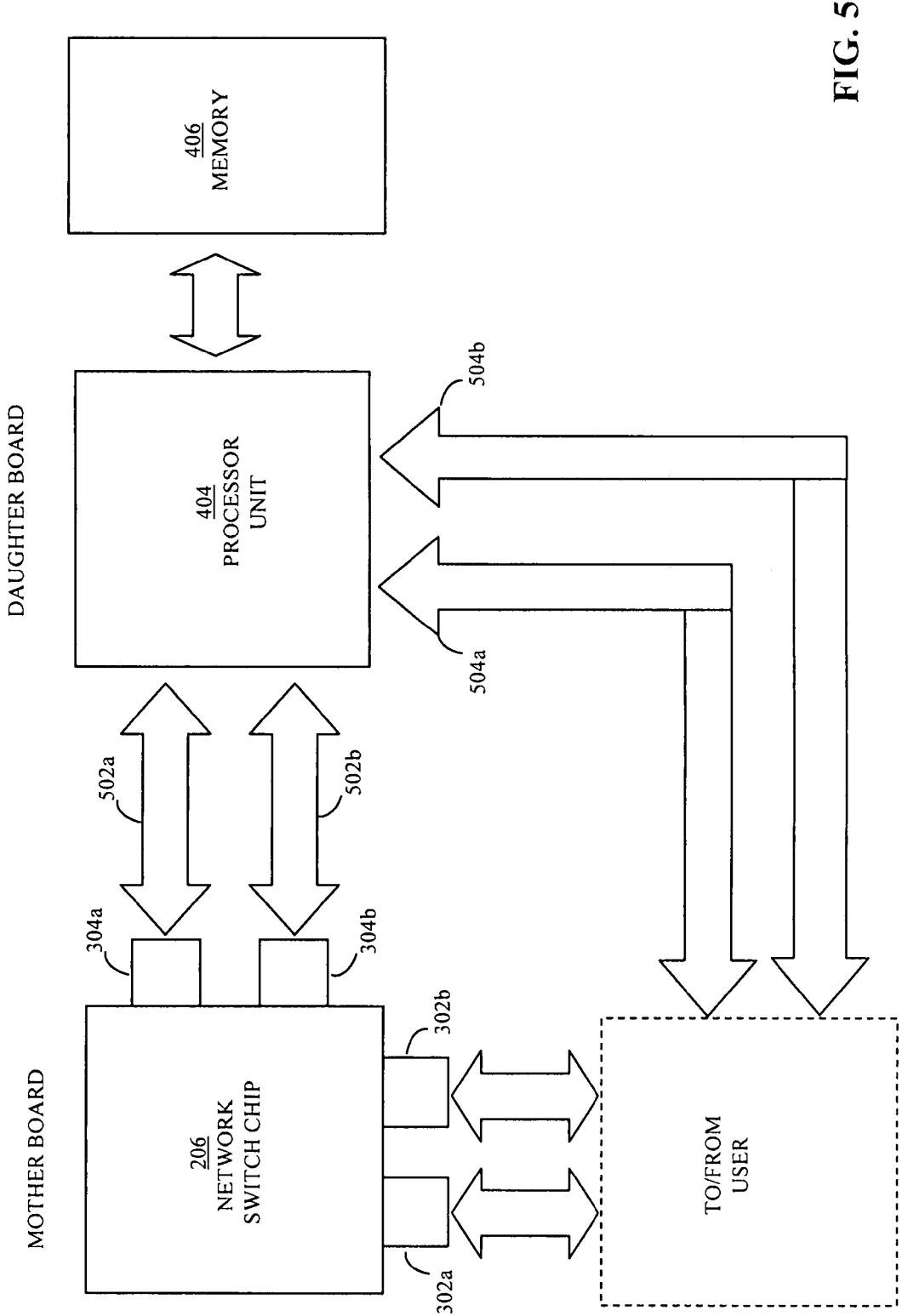
FIG. 5 illustrates an exemplary packet handling process in an exemplary packet switch appliance with a daughter board having a processor unit.

FIG. 5 logically depicts an example of packet flow in a network switch appliance 102 having a mother board removably connected to a daughter board having a processor unit.

In a first example, a packet is routed from an ingress network connection to an egress instrument connection, both connected to processor unit 404. Assume that connection 504a is a network connection, that connection 504b is an instrument connection, and that the packet switch appliance is configured to route all packets from network connection 504a to instrument connection 504b. An ingress packet received at network connection 504a is routed to instrument connection 504b by processor unit 404.

In a second example, a packet is routed from an ingress port on network switch chip 206 to an instrument connection of processor unit 404. Assume that port 302a is a network port on network switch chip 206, that ports 304a and 304b are transport ports on network switch chip 206, that connections 502a and 502b are transport connections between network switch chip 206 and processor unit 404, and that connection 504b is an instrument connection. Further assume that the packet switch appliance is configured to route all packets from network port 302a to instrument connection 504b. An ingress packet received at network port 302a is routed to transport port 304a or 304b for egress by network switch chip 206. The packet is received by processor unit 404 via connection 502a or 502b and routed to instrument connection 504b for egress. Accordingly, packets received by the packet switch appliance may be routed either through a network switch chip, a processor unit, or a combination of a network switch chip and a processor unit, based on the ingress and egress ports or connections.

In a third example, a packet is routed from an ingress port to an egress port, both on network switch chip 206, with time stamping. Assume that port 302a is a network port on network switch chip 206, that port 302b is an instrument port on network switch chip 206, that ports 304a and 304b are transport ports on network switch chip 206, and that connections 502a and 502b are connections between network switch chip 206 and processor unit 404. Further assume that the packet switch appliance is configured to route all packets from network port 302a to instrument port 302b, after time stamping each packet. An ingress packet received at network port 302a is routed to transport port 304a for egress by network switch chip 206. The packet is received by processor unit 404 via connection 502a and time stamped. In another embodiment, the ingress packet is routed via transport port 304b and received at connection 502b. The time stamped packet is routed back to network switch chip 206 through connections 502a and transport ports 304a for egress at instrument port 302b.

G. Daughter Board with Network Switch Chip and Processor Unit

In another embodiment of the network switch appliance depicted in FIG. 6, daughter board 602 is configured to be removably connected to mother board 202. In a particular embodiment, daughter board 602 is connected to mother board 202 after the removal of daughter board 210 or daughter board 402. Daughter board 602 is configured with a processor unit 604, memory 606, and network switch chip 608, each of which may be configured as described above. Daughter board 602 provides, in addition to packet distribution capabilities, packet processing capabilities. Processor unit 604 may be connected with memory 606 and network switch chip 608. Daughter board 602 may also comprise numerous other components and may be oriented relative to motherboard 202, as described for daughter board 210.

Figure 7:
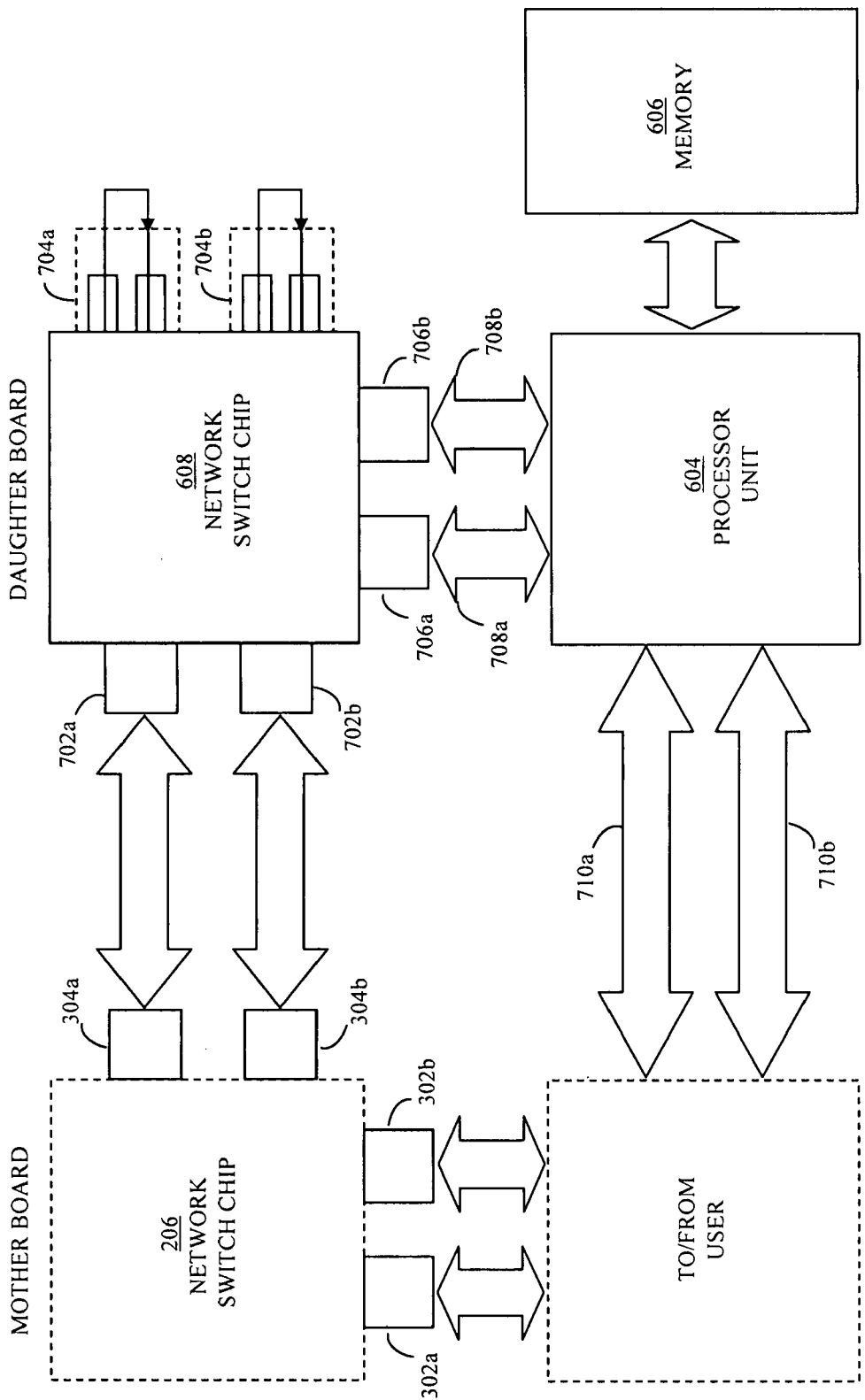
FIG. 7 illustrates an exemplary packet handling process in an exemplary packet switch appliance with a daughter board having a processor unit and a network switch.

H. Packet Flow in Appliance with a Daughter Board Having a Processor Unit and a Network Switch Chip FIG. 7 logically depicts an example of packet flow in a network switch appliance 102 having a mother board removably connected to a daughter board having a processor unit and a network switch chip.

In a first example, a packet is routed from an ingress port on network switch chip 206 to an egress connection of processor unit 604. Assume that port 302a is a network port on network switch chip 206, that ports 304a, 304b, 702a, 702b, 706a, and 706b are transport ports, that connections 708a and 708b are transport connections between network switch chip 608 and processor 604, and that connection 710b is an instrument connection of processor unit 604. Further assume that the packet switch appliance is configured to route all packets from network port 302a to instrument connection 710b. An ingress packet received at network port 302a is routed to transport port 304a or 304b for egress by network switch chip 206. The packet is received by network switch chip 608 at transport port 702a and routed to transport port 706a for egress. The packet is subsequently received by processor unit 604 via connection 708a and routed to instrument connection 710b for egress. Accordingly, packets received by the packet switch appliance may be routed either through a network switch chip, a processor unit, or a combination of one or more network switch chips and processor units, based on the ingress and egress ports or connections.

In a second example, packet traffic is routed from an ingress port to an egress port, both on network switch chip 206, with HTTP-only filtering and time stamping. Assume that port 302a is a network port, that port 302b is an instrument port, that ports 304a, 304b, 702a, 702b, 706a, and 706b are transport ports, that connections 708a and 708b are transport connections between network switch chip 608 and processor 604, and that port 704a is a loop-back port having an HTTP-only ingress filter. Further assume that the packet appliance is configured to route only HTTP packets from network port 302a to instrument port 302b. However, it is desirable to have network port 302a also forward all packets to ports other than 302b via one-to-many packet distribution and for instrument port 302b to receive all packets from ports other than network port 302a via many-to-one packet distribution. Ingress packet traffic comprising both HTTP and non-HTTP packets is received at network port 302a and routed to transport port 304a or 304b for egress by network switch chip 206. The packet is received by network switch chip 608 at transport port 702a and routed to loop-back port 704a where non-HTTP packets are dropped by the HTTP-only ingress filter. The HTTP-only packet traffic is routed to transport port 706a for egress. The packet traffic is subsequently received by processor unit 604 via transport connection 708a and time stamped. The HTTP-only, time stamped packet traffic is routed back to network switch chip 608 and subsequently to network switch chip 206 for egress at instrument port 302b.

It is understood that network switch chip 206, network switch chip 608, and processor unit 604 may be variably configured such that packet traffic may pass through only one, some, or all of network switch chip 206, network switch chip 608, or processor unit 604, in any permutation. It is further understood that any combination of network, instrument, and transport ports or connections, with or without loop-back ports, may be employed to provide a desired routing or other packet handling scheme in combination with one or more network switch chips, processor units, or a combination of a network switch chips and processor units.

We claim:

1. A packet switch appliance configured to be connected to a packet-switching network and a network instrument, the packet switch appliance comprising:
 a mother board having:
  a processor;
  a first network switch chip; and
  a connector;
 a first daughter board configured to be removably connected to the motherboard through the connector on the mother board, the first daughter board having a second network switch chip having a plurality of ports; and
 a computer-readable storage medium containing computer-executable instructions to operate the second network switch chip, comprising instructions to:
 configure one or more ports of the plurality of ports to operate as a loop-back port, the loop-back port having an egress portion to send out a packet and an ingress portion to loop back the packet sent out the egress portion.

2. The packet switch appliance of claim 1, wherein the egress portion is a first port of the plurality of ports and the ingress portion is a second port of the plurality of ports.

3. The packet switch appliance of claim 1, further comprising instructions to:
assign a filter to the egress portion or ingress portion of the loop-back port or to another port of the plurality of ports.

4. The packet switch appliance of claim 1, wherein the computer-readable storage medium is disposed on the mother board.

5. A packet switch appliance configured to be connected to a packet-switching network and a network instrument, the packet switch appliance comprising:
a mother board having:
a processor;
a first network switch chip; and
a connector;
a first daughter board configured to be removably connected to the motherboard through the connector on the mother board, the first daughter board having a second network switch chip having a plurality of ports;
a second daughter board, wherein the second daughter board is configured to be removably connected to the motherboard through the connector, and wherein the second daughter board comprises a first processor unit; and
a memory disposed on the second daughter board, the memory connected to the first processor unit, and wherein the first processor unit includes firmware having instructions to:
buffer packets on the memory.

6. A packet switch appliance configured to be connected to a packet-switching network and a network instrument, the packet switch appliance comprising:
a mother board having:
a processor;
a first network switch chip; and
a connector;
a first daughter board configured to be removably connected to the motherboard through the connector on the mother board, the first daughter board having a second network switch chip having a plurality of ports;
a second daughter board, wherein the second daughter board is configured to be removably connected to the motherboard through the connector, and wherein the second daughter board comprises a first processor unit;
a third daughter board, wherein the third daughter board is configured to be removably connected to the motherboard through the connector, and wherein the third daughter board comprises a second processor unit, and a third network switch chip; and
a memory disposed on the third daughter board, the memory connected to the second processor unit, and wherein the second processor unit includes firmware having instructions to:
buffer packets on the memory.

7. A packet switch appliance configured to be connected to a packet-switching network and a network instrument, the packet switch appliance comprising:
a mother board having:
a processor;
a first network switch chip; and
a connector;
a first daughter board configured to be removably connected to the motherboard through the connector on the mother board, the first daughter board having a second network switch chip having a plurality of ports;
a second daughter board, wherein the second daughter board is configured to be removably connected to the motherboard through the connector, and wherein the second daughter board comprises a first processor unit; and
a third daughter board, wherein the third daughter board is configured to be removably connected to the motherboard through the connector, and wherein the third daughter board comprises a second processor unit, and a third network switch chip;
wherein the third network switch chip has another plurality of ports, the packet switch appliance further comprising:
a computer-readable storage medium containing computer-executable instructions to operate the third network switch chip, comprising instructions to:
configure one or more ports of the another plurality of ports to operate as a loop-back port, the loop-back port having an egress portion to send out a packet and an ingress portion to loop back the packet sent out the egress portion.

8. The packet switch appliance of claim 7, wherein the egress portion is a first port of the another plurality of ports and the ingress portion is a second port of the another plurality of ports.

9. The packet switch appliance of claim 7, further comprising instructions to:
assign a filter to the egress portion or ingress portion of the loop-back port.

10. A packet switch appliance configured to be connected to a packet-switching network and a network instrument, the packet switch appliance comprising:
a mother board having:
a processor;
a first network switch chip;
a connector; and
a first daughter board configured to be removably connected to the motherboard through the connector on the mother board, the first daughter board having a first processor unit with firmware having instructions to slice packets, modify packets, copy packets, or flow control packets; and
a memory disposed on the first daughter board, the memory connected to the first processor unit, and wherein the processor unit includes firmware having instructions to:
buffer packets on the memory.

11. A packet switch appliance configured to be connected to a packet-switching network and a network instrument, the packet switch appliance comprising:
a mother board having:
a processor;
a first network switch chip;
a connector; and
a first daughter board configured to be removably connected to the motherboard through the connector on the mother board, the first daughter board having a first processor unit with firmware having instructions to slice packets, modify packets, copy packets, or flow control packets;
a second daughter board, wherein the second daughter board is configured to be removably connected to the motherboard through the connector, and wherein the second daughter board comprises a second processor unit, and a second network switch chip; and a memory disposed on the second daughter board, the memory connected to the second processor unit, and wherein the first processor unit includes firmware having instructions to:

buffer packets on the memory;

wherein the first processor unit is a network processor unit (NPU), an application specific integrated circuit (ASIC), a field programmable logic gate array (FPGA), multi-core processor, or multicore packet processor.

12. A packet switch appliance configured to be connected to a packet-switching network and a network instrument, the packet switch appliance comprising:

a mother board having:

a processor;

a first network switch chip;

a connector; and a first daughter board configured to be removably connected to the motherboard through the connector on the mother board, the first daughter board having a first processor unit with firmware having instructions to slice packets, modify packets, copy packets, or flow control packets;

a second daughter board, wherein the second daughter board is configured to be removably connected to the motherboard through the connector, and wherein the second daughter board comprises a second processor unit, and a second network switch chip;

wherein the second network switch chip has a plurality of ports, the packet switch appliance further comprising:

a computer-readable storage medium containing computer-executable instructions to operate the second network switch chip, comprising instructions to:

configure one or more ports of the plurality of ports to operate as a loop-back port, the loop-back port having an egress portion to send out a packet and an ingress portion to loop back the packet sent out the egress portion;

wherein the first processor unit is a network processor unit (NPU), an application specific integrated circuit (ASIC), a field programmable logic gate array (FPGA), multi-core processor, or multicore packet processor.

13. The packet switch appliance of claim 12, wherein the egress portion is a first port of the plurality of ports and the ingress portion is a second port of the plurality of ports.

14. The packet switch appliance of claim 12, further comprising instructions to:

assign a filter to the egress portion or ingress portion of the loop-back port.

15. A method of operating a packet switch appliance, wherein the packet switch appliance includes a motherboard having a processor, a first network switch chip, and a connector; the packet switch appliance further including a daughter board configured to be removably connected to the motherboard through the connector, the daughter board having a second network switch chip having a plurality of ports, the method comprising:

configuring one or more ports of the plurality of ports of the second network switch chip on the daughter board to operate as a loop-back port, the loop-back port having an egress portion to send out a packet and an ingress portion to loop back the packet sent out the egress portion.

16. The method of claim 15, wherein the egress portion is a first port of the plurality of ports and the ingress portion is a second port of the plurality of ports.

17. The method of claim 15, further comprising:

assigning a filter to the egress portion or ingress portion of the loop-back port.

18. The method of claim 15, further comprising:

configuring one or more ports of the plurality of ports of the second network chip on the daughter board to operate as a transport port, the transport port configured to receive packets from or forward packets to the first network chip.

19. The method of claim 15, wherein the packet switch appliance further comprises a second daughter board configured to be removably connected to the mother board through the connector, and wherein the second daughter board comprises:

a first processor unit;

the method further comprising:

slicing a packet using the first processor unit;

modifying a packet using the first processor unit;

copying a packet using the first processor unit; or flow controlling a packet using the first processor unit.

20. The method of claim 19, wherein the packet switch appliance further comprises a third daughter board configured to be removably connected to the mother board through the connector, and wherein the third daughter board comprises:

a second processor unit; and a third network switch chip having another plurality of ports;

the method further comprising:

configuring one or more ports of the another plurality of ports of the third network switch chip on the daughter board to operate as another loop-back port, the another loop-back port having a egress portion to send out another packet and an ingress portion to loop back the another packet sent out the egress portion of the another loop-back port;

slicing a packet using the second processor unit;

modifying a packet using the second processor unit;

copying a packet using the second processor unit; or flow controlling a packet using the second processor unit.

21. The method of claim 20, wherein the egress portion of the another loop-back port is a first port of the another plurality of ports and the ingress portion of the another loop-back port is a second port of the another plurality of ports.

22. The method of claim 20, further comprising:

configuring one or more ports of the plurality of ports of the third network chip on the daughter board to operate as a transport port, the transport port configured to receive packets from or forward packets to the first network chip or the second processor unit.

23. A computer-readable storage medium containing computer-executable instructions to configure one or more ports of a packet switch appliance as a loop-back port, wherein the packet switch appliance includes a motherboard having a processor, a first network switch chip, and a connector, the packet switch appliance further including a daughter board configured to be removably connected to the motherboard through the connector on the mother board, the daughter board having a second network switch chip having a plurality of ports, comprising instructions for:

configuring one or more ports of the plurality of ports of the second network switch chip on the daughter board to operate as a loop-back port, the loop-back port having an egress portion to send out a packet and an ingress portion to loop back the packet sent out the egress portion.

24. The computer-readable storage medium of claim 23, wherein the egress portion is a first port of the plurality of ports and the ingress portion is a second port of the plurality of ports.

25. The computer-readable storage medium of claim 23, further comprising instructions for:
  assigning a filter to the egress portion or ingress portion of the loop-back port.

26. The computer-readable storage medium of claim 23, further comprising instructions for:
  configuring one or more ports of the plurality of ports of the second network chip on the daughter board to operate as a transport port, the transport port configured to receive packets from or forward packets to the first network chip.

27. The computer-readable storage medium of claim 23, wherein the packet switch appliance further comprises a second daughter board configured to be removably connected to the mother board through the connector, and wherein the second daughter board comprises:
  a first processor unit;
  the computer-readable storage medium further comprising instructions for:
  slicing a packet using the first processor unit;
  modifying a packet using the first processor unit;
  copying a packet using the first processor unit; or
  flow controlling a packet using the first processor unit.

28. The computer-readable storage medium of claim 27, wherein the packet switch appliance further comprises a third daughter board configured to be removably connected to the mother board through the connector, and wherein the third daughter board comprises:
  a second processor unit; and
  a third network switch chip having another plurality of ports;
  the computer-readable storage medium further comprising instructions for:
  configuring one or more ports of the another plurality of ports of the third network switch chip on the daughter board to operate as another loop-back port, the another loop-back port having a egress portion to send out another packet and an ingress portion to loop back the another packet sent out the egress portion of the another loop-back port;
  slicing a packet using the second processor unit;
  modifying a packet using the second processor unit;
  copying a packet using the second processor unit; or
  flow controlling a packet using the second processor unit.

29. The computer-readable storage medium of claim 28, wherein the egress portion of the another loop-back port is a first port of the another plurality of ports and the ingress portion of the another loop-back port is a second port of the another plurality of ports.

30. The computer-readable storage medium of claim 28, further comprising instructions for:
  configuring one or more ports of the plurality of ports of the third network chip on the daughter board to operate as a transport port, the transport port configured to receive packets from or forward packets to the first network chip or the second processor unit.

31. A packet switch appliance configured to be connected to a packet-switching network and a network instrument, the packet switch appliance comprising:
  a mother board having:
    a processor;
    a first network switch chip; and
    a connector; and
  a first daughter board configured to be removably connected to the motherboard through the connector on the mother board, the first daughter board having a second network switch chip with a plurality of ports;
  wherein the first network switch chip is configured to transmit a packet from a network port to an instrument port, the instrument port being a different port from the plurality of ports at the second network switch, and wherein the instrument port is configured to communicate with an instrument that is coupled to the packet switch appliance.

32. The packet switch appliance of claim 31, wherein the instrument comprises a sniffer, an intrusion prevention system, an intrusion detection system, or a forensic recorder.

33. The packet switch appliance of claim 31, wherein the first network switch chip comprises a transport port configured to receive packets from or forward packets to the second network switch chip.

34. The packet switch appliance of claim 31, further comprising:
  a second daughter board, wherein the second daughter board is configured to be removably connected to the motherboard through the connector, and wherein the second daughter board comprises:
    a first processor unit.

35. The packet switch appliance of claim 34, wherein the first processor unit is a network processor unit (NPU), an application specific integrated circuit (ASIC), a field programmable logic gate array (FPGA), multicore processor, or multicore packet processor.

36. The packet switch appliance of claim 34, wherein the first processor unit includes firmware having instructions to:
  slice packets;
  modify packets;
  copy packets; or
  flow control packets.

37. The packet switch appliance of claim 34, wherein the first network switch chip comprises a transport port configured to receive packets from or forward packets to the first processor unit.

38. The packet switch appliance of claim 34, further comprising:
  a third daughter board, wherein the third daughter board is configured to be removably connected to the motherboard through the connector, and wherein the third daughter board comprises:
    a second processor unit; and
    a third network switch chip.

39. The packet switch appliance of claim 38, wherein the second processor unit includes firmware having instructions to:
  slice packets;
  modify packets;
  copy packets; or
  flow control packets.

40. The packet switch appliance of claim 7, wherein the third network chip comprises a transport port configured to receive packets from or forward packets to the first network chip or the second processor unit.

41. A packet switch appliance configured to be connected to a packet-switching network and a network instrument, the packet switch appliance comprising:
  a mother board having a processor, a first network switch chip, and a connector; and
  a first daughter board configured to be removably connected to the motherboard through the connector on the mother board, the first daughter board having:

a first processor unit with firmware having instructions to slice packets, modify packets, copy packets, or flow control packets;

wherein the first network switch chip is configured to transmit a packet from a network port to an instrument port, and wherein the instrument port is configured to communicate with an instrument that is coupled to the packet switch appliance.

42. The packet switch appliance of claim 41, wherein the instrument comprises a sniffer, an intrusion prevention system, an intrusion detection system, or a forensic recorder.

43. The packet switch appliance of claim 41, wherein the first processor unit is a network processor unit (NPU), an application specific integrated circuit (ASIC), a field programmable logic gate array (FPGA), multicore processor, or multicore packet processor.

44. The packet switch appliance of claim 43, further comprising:

a second daughter board, wherein the second daughter board is configured to be removably connected to the motherboard through the connector, and wherein the second daughter board comprises:

a second processor unit; and a second network switch chip.

45. The packet switch appliance of claim 44, wherein the second network chip comprises a transport port configured to receive packets from or forward packets to the first network chip or the second processor unit.

* * * * *